United States Patent
Odendall

(10) Patent No.: US 7,418,853 B2
(45) Date of Patent: Sep. 2, 2008

(54) PROCESS FOR DIAGNOSIS OF A LAMBDA PROBE ASSOCIATED WITH THE EXHAUST GAS CATALYTIC CONVERTER OF AN INTERNAL COMBUSTION ENGINE

(75) Inventor: Bodo Odendall, Buxheim (DE)

(73) Assignee: Audi AG, Ingolstadt (DE)

( * ) Notice: Subject to any disclaimer, the term of this patent is extended or adjusted under 35 U.S.C. 154(b) by 329 days.

(21) Appl. No.: 11/398,640

(22) Filed: Apr. 6, 2006

(65) Prior Publication Data
US 2006/0243592 A1    Nov. 2, 2006

(30) Foreign Application Priority Data
Apr. 8, 2005    (DE) ................. 10 2005 016 075

(51) Int. Cl.
*F01N 11/00*    (2006.01)
(52) U.S. Cl. ........................... 73/1.06; 204/401
(58) Field of Classification Search ................. 73/1.06; 204/401; 701/34; 702/116
See application file for complete search history.

(56) References Cited

U.S. PATENT DOCUMENTS

| | | | | |
|---|---|---|---|---|
| 4,887,576 A | * | 12/1989 | Inamoto et al. | 123/688 |
| 5,423,203 A | * | 6/1995 | Namiki et al. | 73/1.06 |
| 5,724,953 A | * | 3/1998 | Jung | 204/401 X |
| 6,000,218 A | * | 12/1999 | Hafele | 60/276 |
| 6,136,169 A | * | 10/2000 | Okamoto | 204/401 |
| 6,287,453 B1 | * | 9/2001 | Rosel et al. | 204/401 X |
| 6,397,583 B1 | * | 6/2002 | Davey et al. | 60/277 |
| 6,649,041 B2 | * | 11/2003 | Hashimoto et al. | 204/401 X |
| 7,021,129 B2 | * | 4/2006 | Busch et al. | 73/118.1 |
| 7,040,085 B2 | * | 5/2006 | Namiki | 60/277 |
| 2006/0021325 A1 | * | 2/2006 | Ikemoto et al. | 60/276 |

FOREIGN PATENT DOCUMENTS

DE    19936355 A1 *    2/2001

* cited by examiner

*Primary Examiner*—Thomas P Noland
(74) *Attorney, Agent, or Firm*—Novak Druce + Quigg LLP

(57) ABSTRACT

In a process for diagnosis of a lambda probe (6) associated with the exhaust gas catalytic converter (3) of an internal combustion engine (1), it is proposed that for a known first and second exhaust gas mass flow $\{\dot{m}_1, \dot{m}_2\}$ through the exhaust gas catalytic converter (3) it is measured how large the respective time delay ($\Delta t_1$, $\Delta t_2$) is until a sudden change of the lambda signal ($\lambda_a$) upstream from the exhaust gas catalytic converter (3) appears for the lambda signal ($\lambda_b$) of the lambda probe (6) associated with the exhaust gas catalytic converter (3), and that based on the measured time delays ($\Delta t_1$, $\Delta t_2$) it is determined how large the catalytic converter-induced portion ($\Delta t_{cat1}$, $\Delta t_{cat2}$) which is dependent on the exhaust gas mass flow ($\{\dot{m}_1, \dot{m}_2\}$) is and how large the probe-induced portion ($\Delta t_{probe1}$, $\Delta t_{probe2}$) of the time delays ($\Delta t_{probe1}$, $\Delta t_{probe2}$) which is essentially independent of the exhaust gas mass flow ($\{\dot{m}_1, \dot{m}_2\}$) is, the probe-induced portion ($\Delta t_{probe1}$, $\Delta t_{probe2}$) being used as a diagnosis criterion for the lambda probe (6). According to the invention an improved diagnosis process is made available by which the current dynamics of the lambda probe (6) associated with the exhaust gas catalytic converter (3) can be determined more accurately and therefore a more reliable diagnosis is possible.

17 Claims, 2 Drawing Sheets

PROCESS FOR DIAGNOSIS OF A LAMBDA PROBE ASSOCIATED WITH THE EXHAUST GAS CATALYTIC CONVERTER OF AN INTERNAL COMBUSTION ENGINE

This application claims priority from German Application No. 102005016075.1, filed Apr. 8, 2005, herein incorporated by reference in its entirety.

BACKGROUND AND SUMMARY OF THE INVENTION

This invention relates to a process for diagnosis of a lambda probe associated with the exhaust gas catalytic converter of an internal combustion engine.

So that lambda control of an internal combustion engine can take place quickly and exactly, it is necessary for the control probe associated with the exhaust gas catalytic converter to have relatively good dynamics. Therefore it is desirable for diagnosis of the control probe to determine the dynamic behavior in order to compare it to a given boundary value.

DE, 44 41 432 A1 discloses a process for monitoring of catalytic converters and/or lambda probes in exhaust gas decontamination systems. In this process a defined change of the lambda value or oxygen content in the exhaust gas is carried out and the electrical signal of the lambda probe located downstream of or in the exhaust gas catalytic converter is compared to a stored value profile which corresponds to the defined change of the lambda value. If the electrical signal is outside a certain tolerance range, either a fault of the catalytic converter or of the lambda probe can be deduced.

Moreover, document DE 199 36 355 A1 discloses another process for monitoring the operation of at least one lambda probe located in the exhaust gas channel of an internal combustion engine. This process calls for the measurement signal of the lambda probe to be detected within a definable diagnosis interval and for the measurement signal of the lambda probe to be compared to a setpoint signal of the lambda probe, the setpoint signal being determined using the model computation which uses the parameters intake air mass, injected fuel mass and/or rpm.

The known processes however can only be used to a limited degree in practice since they only inadequately take into account the dynamic behavior of the lambda probes and based on the stored value profile or complex model computation are subject to major inaccuracies.

Against this background the object of this invention is to make available an improved process for diagnosis of a lambda probe which is associated with an exhaust gas catalytic converter of an internal combustion engine, which better assesses the dynamic behavior and which moreover can be carried out more easily.

This object is achieved by its being measured for a known first and second exhaust gas mass flow through the exhaust gas catalytic converter how large the respective time delay is until a sudden change of the lambda signal upstream from the exhaust gas catalytic converter appears for the lambda signal of the lambda probe associated with an exhaust gas catalytic converter, and based on the measured time delays it is determined how large the catalytic converter-induced portion which is dependent on the exhaust gas mass flow is and how large the probe-induced portion of the time delays which is essentially independent of the exhaust gas mass flow is, the probe-induced portion being used as a diagnosis criterion for the lambda probe.

Preferably the catalytic converter-induced portion of the time delays is regarded as an inversely proportional fiction of the exhaust gas mass flow. This is because the catalytic converter-induced portion is based on the effect that the charging or discharging of oxygen which is coupled to the exhaust gas mass flow into the oxygen reservoir of the exhaust gas catalytic converter more or less damps the lambda signal of the lambda probe associated with the exhaust has catalytic converter, therefore located downstream or in the exhaust gas catalytic converter.

Here a small exhaust gas mass flow causes little charging or discharging of oxygen so that for a certain oxygen reservoir capacity of the exhaust gas catalytic converter it can take longer until the sudden change of the lambda signal of the second lambda probe follows the sudden change of the lambda signal of the first lambda probe, which latter change is coupled to the charging or discharging of oxygen.

In contrast, a large exhaust gas mass flow causes high charging or discharging of oxygen so that at a certain oxygen reservoir capacity of the exhaust gas catalytic converter it can take accordingly a shorter time until the sudden change of the second lambda probe follows the sudden change of the first lambda probe.

Moreover the catalytic converter-induced portion of the time delays can also be regarded as an inversely proportional fiction of the velocity for charging or for discharging of oxygen into the oxygen reservoir of the exhaust gas catalytic converter. According to this fiction the time delays rise with decreasing velocities for charging and for discharging of oxygen. Moreover it has been found that the time delays at the same velocities for charging as for discharging of oxygen obey hysteresis and therefore can be unequal.

The probe-induced portion of the time delays is especially preferably regarded as a constant. In this way it becomes clear that the probe-induced time delays result primarily from the diffusion of the oxygen contained in the exhaust gas into the sensor element of the lambda probe. This diffusion is hindered with increasing ageing of the lambda probe by fouling and soot build-up so that the diffusion times from the exhaust gas catalytic converter into the ceramic sensor element increase and the probe-induced portion of the time delays rises.

Advantageously the first and second exhaust gas mass flow are different enough to achieve an accurate as possible determination of the catalytic converter-induced portion which is dependent on the exhaust gas mass flow, and of the probe-induced portion of the time delays which is independent of the exhaust gas mass flow.

BRIEF DESCRIPTION OF THE DRAWINGS

This invention is detailed with reference to the following figures in the drawings.

DETAILED DESCRIPTION

Figure 1:
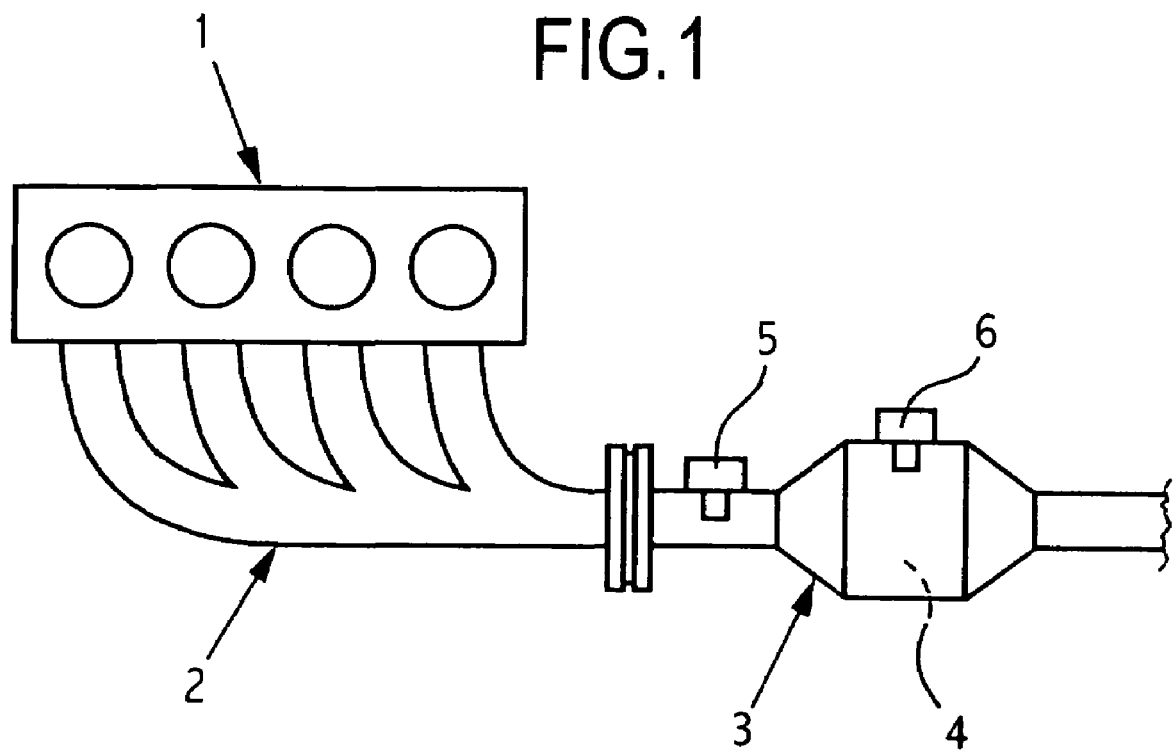
FIG. 1 shows a schematic of an internal combustion engine with an exhaust gas system.
Figure 2:
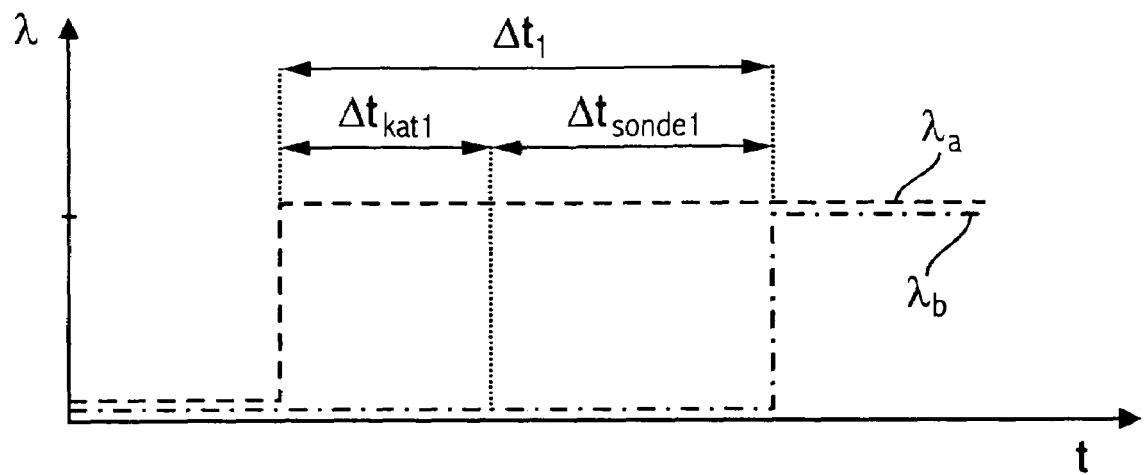
FIGS. 2 and 3 show two simplified diagrams which illustrate the lambda signals of the first lambda probe located upstream from the exhaust gas catalytic converter and the lambda signals of the second lambda probe located downstream of the exhaust gas catalytic converter for different exhaust gas mass flows.
Figure 3:
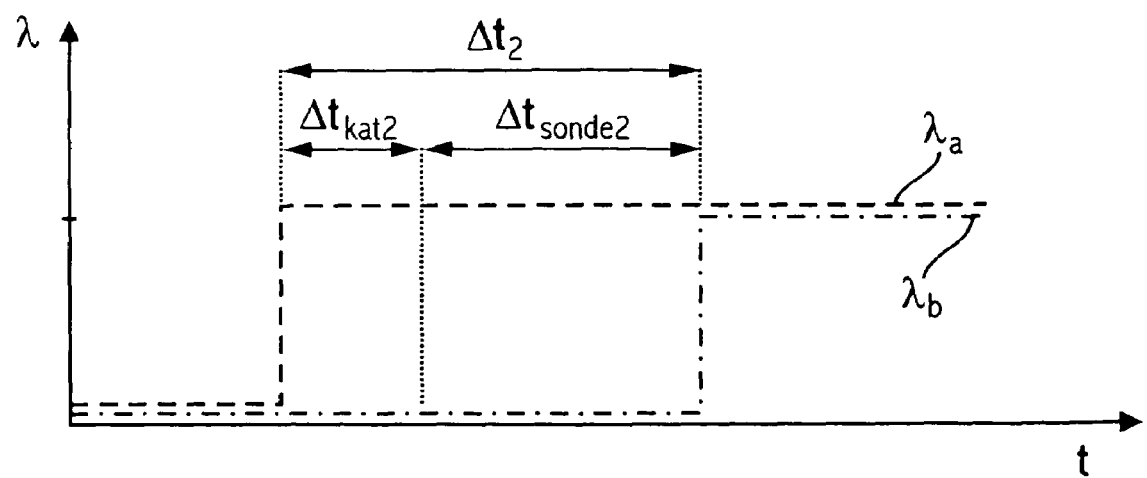

FIG. 1 shows a schematic of an internal combustion engine 1 with an exhaust gas line 2. The exhaust gas line 2 comprises an exhaust gas catalytic converter 3 which is made for example as an NOx storage catalytic converter or as an active particle filter, and contains an integrated oxygen reservoir 4, and a first lambda probe 5 which is located upstream of the exhaust gas catalytic converter 3 and which is used as a guide probe, as well as a second lambda probe 6 associated with an exhaust gas catalytic converter 3 and which is used as a control probe.

The second lambda probe 6 which is to be diagnosed for its serviceability with the process described below is located downstream of the exhaust gas catalytic converter 3 in this exemplary embodiment. Equally well this second lambda probe could however also be located directly in the exhaust gas catalytic converter 3, i.e. downstream of a partial volume of the oxygen reservoir 4.

So that the internal combustion engine 1 can be adjusted promptly and exactly to the desired lambda value, it is necessary for the second lambda probe 6 which is used as the control probe to have relatively good dynamics, therefore to react relatively promptly to changes of the exhaust gas composition so that these changes or disruptions can be immediately compensated.

To diagnose the second lambda probe 6 it is therefore checked how long it takes at different exhaust gas mass flows $\{\dot{m}_1, \dot{m}_2\}$ until the second lambda probe 6 reacts to a sudden change of the lambda signal $\lambda_a$ of the first lambda probe 5. The time delays $\Delta t_1$ and $\Delta t_2$ measured in this connection are based essentially on a catalytic converter-induced effect and a probe-induced effect which are added to one another.

The catalytic converter-induced effect is formed in that depending on how strongly or quickly the oxygen reservoir 4 of the exhaust gas catalytic converter 5 is loaded with oxygen or unloaded by the altered exhaust gas composition, the sudden change of the lambda signal $\lambda_a$ upstream from the exhaust gas catalytic converter 3 damped or delayed can be observed as a sudden change of the lambda signal $\lambda_b$ downstream from the exhaust gas catalytic converter 3.

And the probe-induced effect is formed in that depending on how much the second lambda probe 6 is aged or contaminated, the time required by the oxygen for diffusion into the probe element of the lambda probe 6 varies.

Here the catalytic converter-induced portion $\Delta t_{cat1}$, $\Delta t_{cat2}$ of the delays $\Delta t_1$, $\Delta t_2$ is coupled to the charging or discharging of oxygen, therefore to the exhaust gas mass flow $\{\dot{m}_1, \dot{m}_2\}$, while the probe-induced portion $\Delta t_{probe1}$, $\Delta t_{probe2}$ of the delays $\Delta t_1$, $\Delta t_2$ is not coupled to the exhaust gas mass flow $\{\dot{m}_1, \dot{m}_2\}$ or only insignificantly so. This means in particular that the catalytic converter-induced portion $\Delta t_{cat1}$, $\Delta t_{cat2}$ of the delays $\Delta t_1$, $\Delta t_2$ is inversely proportional to the exhaust gas mass flow $\{\dot{m}_1, \dot{m}_2\}$ and moreover is also dependent on the velocity $V_1$, $V_2$ of charging or discharging of oxygen, conversely the probe-induced portion $\Delta t_{probe1}$, $\Delta t_{probe2}$ of the delays $\Delta t_1$, $\Delta t_2$ can be regarded as a constant C, so that $\Delta t_{probe1}$ is equal to $\Delta t_{probe2}$.

Based on these regularities, as claimed in the invention for two relatively different exhaust gas mass flows $\{\dot{m}_1, \dot{m}_2\}$, specifically a first small exhaust gas mass flow $\{m_1\}$ and a second large exhaust gas mass flow $\{\dot{m}_2\}$ the delays $\Delta t_1$, $\Delta t_2$ of the lambda signal $\lambda_b$ of the second lambda probe 6 are measured relative to the lambda signal $\lambda_a$ of the first lambda probe 6, and the probe-induced portion $\Delta t_{probe1}=\Delta_{probe2}$ of the delays $\Delta t_1$, $\Delta t_2$ which is independent of the exhaust gas mass flow $\{\dot{m}_1, \dot{m}_2\}$ is determined. This probe-induced portion $\Delta t_{probe1}$ and $\Delta t_{probe2}$ of the delays $\Delta t_1$, $\Delta t_2$ is finally compared to a given boundary value G so that when the boundary value G is exceeded a second lambda probe 6 which is no longer dynamic enough, therefore defective, is displayed.

$$\Delta t_1 = \Delta t_{cat1} + \Delta t_{probe1}$$

$$\Delta t_2 = \Delta t_{cat2} + \Delta t_{probe2}$$

$$\Delta t_{cat1} = f(1/\{\dot{m}_1\})$$

$$\Delta t_{cat2} = f(1/\{\dot{m}_2\})$$

$$\Delta t_{probe1} = \Delta t_{probe2} = C$$

| | List of reference numbers: |
|---|---|
| 1 | internal combustion engine |
| 2 | exhaust gas line |
| 3 | exhaust gas catalytic converter |
| 4 | oxygen reservoir |
| 5 | first lambda probe |
| 6 | second lambda probe |
| $\{\dot{m}_1, \dot{m}_2\}$ | exhaust gas mass flow |
| $V_1, V_2$ | velocity of charging or discharging of oxygen into the oxygen reservoir |
| $\lambda_a, \lambda_b$ | lambda signal |
| $\Delta t_1, \Delta t_2$ | time delay |
| $\Delta t_{cat1}, \Delta t_{cat2}$ | catalytic converter-induced portion |
| $\Delta t_{probe1}, \Delta t_{probe2}$ | probe-induced portion |
| C | constant |
| G | boundary value |

The invention claimed is:

1. Process for diagnosis of a lambda probe associated with an exhaust gas catalytic converter of an internal combustion engine, said process comprising:

measuring respective time delays ($\Delta t_1$ and $\Delta t_2$) until a sudden change in a lambda signal ($\lambda_a$) upstream from the exhaust gas catalytic converter appears for the lambda signal ($\lambda_b$) of the lambda probe associated with the exhaust gas catalytic converter for a known first and second exhaust gas mass flow $\{m_1, m_2\}$ through an exhaust gas catalytic converter, and determining, based on the measured time delays ($\Delta t1$, $\Delta t2$), how large a catalytic converter-induced portion ($\Delta t_{cat1}$, $\Delta t_{cat2}$) which is dependent on the exhaust gas mass flow ($\{m_1, m_2\}$) is and how large a probe-induced portion ($t\Delta_{probe1}$, $\Delta_{tprobe2}$) of the time delays ($\Delta t_1$, $\Delta t_2$) which is essentially independent of the exhaust gas mass flow ($\{m_1, m_2\}$) is, the probe-induced portion ($\Delta t_{probe1}$, $\Delta t_{probe2}$) being used as a diagnosis criterion for the lambda probe.

2. Process as claimed in claim 1, wherein the catalytic converter-induced portion ($\Delta t_{cat1}$, $\Delta t_{cat2}$) of the time delays ($\Delta t_1$, $\Delta t_2$) is regarded as an inversely proportional function of the exhaust gas mass flow ($\{m_1, m_2\}$).

3. Process as claimed in claim 2, wherein the catalytic converter-induced portion ($\Delta t_{cat1}$, $\Delta t_{cat2}$) of the time delays ($\Delta t_1$, $\Delta t_2$) are calculated as an inversely proportional function of the velocity ($V_1$, $V_2$) for charging or for discharging of oxygen into the oxygen reservoir of the exhaust gas catalytic converter.

4. Process as claimed in claim 3, wherein the probe-induced portion ($\Delta t_{probe1}$, $\Delta t_{probe2}$) of the time delays ($\Delta t_1$, $\Delta t_2$) is a constant (C).

5. Process as claimed in claim 4, wherein the first exhaust gas mass flow $\{m_1\}$ and the second exhaust gas mass flow $\{m_2\}$ are different.

6. Process as claimed in claim 3, wherein the first exhaust gas mass flow $\{m_1\}$ and the second exhaust gas mass flow $\{m_2\}$ are different.

7. Process as claimed in claim 2, wherein the probe-induced portion ($\Delta t_{probe1}$, $\Delta t_{probe2}$) of the time delays ($\Delta t_1$, $\Delta t_2$) is a constant (C).

8. Process as claimed in claim 7, wherein the first exhaust gas mass flow $\{m_1\}$ and the second exhaust gas mass flow $\{m_2\}$ are different.

9. Process as claimed in claim 2, wherein the first exhaust gas mass flow $\{m_1\}$ and the second exhaust gas mass flow $\{m_2\}$ are different.

10. Process as claimed in claim 1, wherein the catalytic converter-induced portion ($\Delta t_{cat1}$, $\Delta t_{cat2}$) of the time delays ($\Delta t_1$, $\Delta t_2$) are calculated as an inversely proportional function of the velocity ($V_1$, $V_2$) for charging or for discharging of oxygen into the oxygen reservoir of the exhaust gas catalytic converter.

11. Process as claimed in claim 10, wherein the probe-induced portion ($\Delta t_{probe1}$, $\Delta t_{probe2}$) of the time delays ($\Delta t_1$, $\Delta t_2$) is a constant (C).

12. Process as claimed in claim 11, wherein the first exhaust gas mass flow $\{m_1\}$ and the second exhaust gas mass flow $\{m_2\}$ are different.

13. Process as claimed in claim 10, wherein the first exhaust gas mass flow $\{m_1\}$ and the second exhaust gas mass flow $\{m_2\}$ are different.

14. Process as claimed in claim 1, wherein the probe-induced portion ($\Delta t_{probe1}$, $\Delta t_{probe2}$) of the time delays ($\Delta t_1$, $\Delta t_2$) is a constant (C).

15. Process as claimed in claim 14, wherein the first exhaust gas mass flow $\{m_1\}$ and the second exhaust gas mass flow $\{m_2\}$ are different.

16. Process as claimed in claim 1, wherein the first exhaust gas mass flow $\{m_1\}$ and the second exhaust gas mass flow $\{m_2\}$ are different.

17. Process as claimed in claim 16, wherein the first exhaust gas mass flow $\{m_1\}$ and the second exhaust gas mass flow $\{m_2\}$ are different.

* * * * *

UNITED STATES PATENT AND TRADEMARK OFFICE
CERTIFICATE OF CORRECTION

PATENT NO.         : 7,418,853 B2
APPLICATION NO. : 11/398640
DATED                 : September 2, 2008
INVENTOR(S)       : Bodo Odendall It is certified that error appears in the above-identified patent and that said Letters Patent is hereby corrected as shown below:

Column 2, line 26 says "fiction" and it should read as "function".

Column 2, line 28 says "fiction" and it should read as "function".

Claim 1, Column 4, Line 47 currently reads "(tΔprobe1, Δtprobe2)" and should read "(Δtprobe1, Δtprobe2)".

Signed and Sealed this

Twenty-fourth Day of March, 2009

JOHN DOLL
*Acting Director of the United States Patent and Trademark Office*